US012492807B1

(12) United States Patent
Zeng

(10) Patent No.: US 12,492,807 B1
(45) Date of Patent: Dec. 9, 2025

(54) MAGNETIC SUCTION CHARGING LAMP BULB, A CHARGING BASE FOR THE LAMP BULB, AND A CONVERSION LAMP CAP FOR THE LAMP BULB

(71) Applicant: HueRich Photo-electronic Technology Co., Ltd., Dongguan (CN)

(72) Inventor: Haoping Zeng, Dongguan (CN)

(73) Assignee: HueRich Photo-electronic Technology Co., Ltd., Dongguan (CN)

(*) Notice: Subject to any disclaimer, the term of this patent is extended or adjusted under 35 U.S.C. 154(b) by 0 days.

(21) Appl. No.: 18/964,774

(22) Filed: Dec. 2, 2024

(30) Foreign Application Priority Data

Aug. 9, 2024 (CN) ......................... 202421937481.4

(51) Int. Cl.
*F21V 21/00* (2006.01)
*F21V 21/096* (2006.01)
*F21V 23/04* (2006.01)
*F21Y 115/10* (2016.01)

(52) U.S. Cl.
CPC ............ *F21V 21/096* (2013.01); *F21V 23/04* (2013.01); *F21Y 2115/10* (2016.08)

(58) Field of Classification Search
CPC ............................... F21V 21/096; F21V 23/04
See application file for complete search history.

(56) References Cited

U.S. PATENT DOCUMENTS

| | | | | |
|---|---|---|---|---|
| 6,380,683 | B1 * | 4/2002 | Kahn | H01J 5/50 315/56 |
| 9,413,104 | B2 * | 8/2016 | Liao | H01R 13/6205 |
| 10,374,353 | B2 * | 8/2019 | Archuleta | H01F 7/0247 |
| 10,941,922 | B2 * | 3/2021 | Benn | H01R 13/6205 |
| 12,305,834 | B2 * | 5/2025 | Li | F21V 21/096 |
| 2002/0180367 | A1 * | 12/2002 | Logan | H05B 47/17 315/119 |
| 2016/0079701 | A1 * | 3/2016 | Liao | F21V 23/06 439/39 |
| 2019/0267825 | A1 * | 8/2019 | Chien | F21S 6/00 |
| 2020/0318800 | A1 * | 10/2020 | Clarke | F21L 4/085 |
| 2021/0140611 | A1 * | 5/2021 | Zhou | F21S 6/003 |
| 2024/0377050 | A1 * | 11/2024 | Lin | F21V 21/116 |
| 2025/0028230 | A1 * | 1/2025 | Moore | F21V 21/096 |

* cited by examiner

*Primary Examiner* — Gerald J Sufleta, II
(74) *Attorney, Agent, or Firm* — JEEN IP LAW, LLC

(57) ABSTRACT

The present invention discloses a magnetic suction charging lamp bulb, a charging base for the lamp bulb, and a conversion lamp cap for the lamp bulb. The technical solution of the present invention is to provide a magnetic suction charging lamp bulb, which increases the universal scenarios of the magnetic suction lamp during use and enhances the versatility of the magnetic suction lamp. The present invention also provides a charging base and a conversion lamp cap for the lamp bulb which can further increase the universal scenarios and strengthen the versatility.

9 Claims, 10 Drawing Sheets

MAGNETIC SUCTION CHARGING LAMP BULB, A CHARGING BASE FOR THE LAMP BULB, AND A CONVERSION LAMP CAP FOR THE LAMP BULB

CROSS-REFERENCE TO RELATED APPLICATIONS

This application claims priority to Chinese Patent Application No. 202421937481.4, filed on Aug. 9, 2024, which is hereby incorporated by reference in its entirety.

TECHNICAL FIELD

The present invention relates to the field of jet printing technology for power lithium battery, particularly to an automatic multi-surface jet printing method for power lithium battery.

BACKGROUND

As a type of linear lighting fixture, magnetic suction lamps are lamps with magnets set on the body, which use the magnetic force to attach the lamp body to the bases of magnetic suction lamps. They are easy to install, can be easily detached for use, and have been well-received by consumers.

The existing magnetic suction lamp technology is simple, with limited universal scenarios in the control, charging, and installation process. The means of control and charging are often singular, typically involving button operation and wired charging for magnetic suction lamps. Additionally, during installation, the existing technology of magnetic suction lamps is limited to being installed on metal parts, resulting in lower versatility.

SUMMARY

The main object of the present invention is to propose a magnetic suction charging lamp bulb, a charging base for the lamp bulb, and a conversion lamp cap for the lamp bulb, aiming at solving the technical problem of less universal scenarios and lower versatility in the application of magnetic suction lamps.

To achieve the above object, the present invention proposes a magnetic suction charging lamp bulb comprising:

- A base, including a charging port and a magnetic suction port provided across a surface;
- LED module, provided in the base. LED module includes a lamp bead and a switching device, and a charging interface provided in conjunction with a charging port relative to the base;
- A magnetic connector, provided within a base. The magnetic suction connector comprises a conductive device and a magnet device for magnetic charging and magnetic mounting, respectively. The conductive device and the magnet device operate through a magnetic suction port;
- A lampshade, disposed over the base for gathering and protecting the light source. Further, the switching device is a push-button switch or a wireless induction switch. Further, the switching device is a push-button switch that includes a housing button and a trigger button offset from each other. The LED module is activated by an external force applied to the housing button and squeezed against the trigger button. The housing button is embedded in the surface of the base, and the trigger button is provided at one end of the LED module.

Further, the switching device is a wireless induction switch that includes a sensor. The LED module is activated by sensing a parameter change from outside through the sensor.

Further, the charging interface is a USB-type interface or a Lightning interface, and the charging interface is disposed monolithically on one side of the LED module. Further, the conductive device comprises conductive probe set as at least one, and the conductive probe is cooperatively provided with a conductive ring.

Further, the base also includes a mechanical fixing part provided at the bottom, and at least one mechanical fixing part is provided.

In addition, the present invention also proposes a charging base for the lamp bulb. The base comprising:

A charging panel and a wire for supplying power. The charging panel is provided with at least one charging slot which includes a magnetic suction part and a conductive part.

Further, the charging panel is provided with a first mechanical docking part. The first mechanical docking part is provided with at least one.

Again, in addition, the present invention proposes a conversion lamp cap for the lamp bulb. The lamp cap comprising:

A bulb end and a fixed end. The bulb end is provided with a second mechanical docking part. The bulb end is connected to the base by the second mechanical docking part being cooperatively mounted on the mechanical fixing part. The second mechanical docking part is provided with at least one, and the fixed end is connected to the external light fixture.

The present invention also provides a charging base and a conversion lamp cap for the lamp bulb which can further increase the universal scenarios and strengthen the versatility. Specifically, first, by setting the magnetic connector in the base, the magnetic connector realizes the function of charging and installation by means of the conductive device and the magnet device; second, diversified control means are realized by setting buttons or sensors for the switching device; third, a mechanical fixing part is set at the bottom of the base to cooperate with the installation on lamps or other components for diversified installation and usage methods.; next, the versatility of wired charging is strengthened by setting up a variety of charging interfaces for the LED module; finally, the present invention also provides a charging base for the lamp bulb and a conversion lamp cap for the lamp bulb, which can further increase the universal scenarios and strengthen the versatility.

Figure 1:
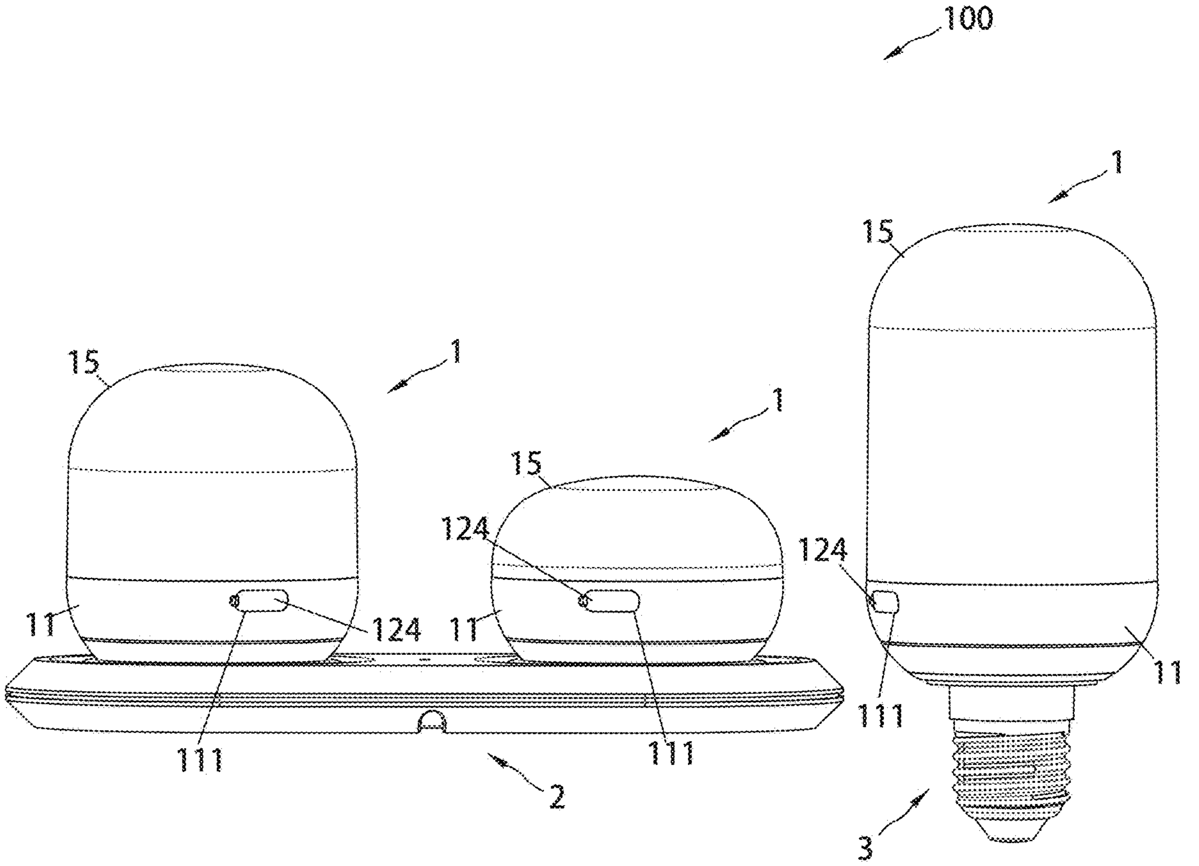
FIG. 1 is a schematic diagram of the planar structure of the present invention.

Wherein, the above-described drawings include the following drawing markings: 100. the present invention; 1. magnetic suction charging lamp bulb; 11. base; 111. charging port; 112. magnetic suction port; 113. mechanical fixing part; 12.LED module; 121. lamp bead; 122. switching device; 1221. housing button; 1222. trigger button; 123. charging interface; 124. blocking airbag; 13. magnetic connector; 131. conductive device; 1311. plastic body; 1311A. baseplate; 1311B, first boss; 1311C, second boss; 1311D, first mounting hole; 1311E, second mounting hole or mounting slot; 1312, housing; 1313, conductive probe; 1314. conductive ring; 1314A. circular contact plate; 1314B. connecting piece; 132. magnet device; 14. fixing plate; 15. lampshade; 2. charging base; 21. charging panel; 211; charging slot; 211A. magnetic suction part; 211B. conductive part; 211C. convex ring; 212. first mechanical docking part; 3. conversion lamp cap; 31. bulb end; 311. second mechanical docking part 32. fixed end.

DESCRIPTION OF EMBODIMENTS

The technical solutions in the embodiments of the present invention 100 will be clearly and completely described below in conjunction with the drawings. Obviously, the described embodiments are only some of the embodiments of the present invention 100, and not all of them. Based on the embodiments in the present invention 100, all other embodiments obtained by a person of ordinary skill in the field without creative labor are within the range of protection of the present invention 100. It is to be noted that if there are directional indications (such as up, down, left, right, forward, backward, top, bottom, inward, outward, vertical, transverse, longitudinal, counterclockwise, clockwise, circumferential, radial, axial . . . ) involved in the embodiments of the present invention 100, the directional indications are only used for explaining relative positional relationships, movement conditions, etc. among the various components in a particular attitude (such as that illustrated in the drawings). If the particular attitude is changed, the directional indication is changed accordingly. Furthermore, if the embodiments of the present invention 100 are described with reference to a “first” or “second” or the like, the description of “first” or “second” is for descriptive purposes only and is not to be construed as indicating or implying relative importance or implicitly specifying the number of technical features indicated. As a result, a feature defined as “first” or “second” may include at least one such feature either explicitly or implicitly. In addition, the technical solutions between the various embodiments may be combined with each other, but it must be on the basis that it can be realized by a person of ordinary skill in the field. When the combination of technical solutions is contradictory or unachievable, it should be considered that such combination of technical solutions does not exist and is not within the range of protection claimed by the present invention 100.

The present invention 100 proposes a magnetic suction charging lamp bulb 1. In embodiments of the present invention 100, as shown in FIG. 1 to FIG. 10, the magnetic suction charging lamp bulb 1 comprises a base 11 and the base 11 comprises a charging port 111 and a magnetic suction port 112 disposed through the surface; the magnetic suction charging lamp bulb 1 also includes an LED module 12 which is provided in the base 11, and the LED module 12 includes a lamp bead 121 and a switching device 122; the magnetic suction charging lamp bulb 1 further includes a charging interface 123 cooperatively provided at the charging port 111 relative to the base 11; the magnetic suction charging lamp bulb 1 further comprises a magnetic connector 13 provided within the base 11 comprising an conductive device 131 and a magnet device 132 for magnetic suction charging and magnetic suction mounting, respectively, and the conductive device 131 and the magnet device 132 operate through the magnetic suction port 112; Finally, the magnetic suction charging lamp bulb 1 also includes a lampshade 15, which is disposed over the base 11 for gathering and protecting the light source.

In this embodiment, the switching device 122 is a push-button switch or a wireless induction switch.

Further, the switching device 122 is a push-button switch that includes a housing button 1221 and a trigger button 1222 offset from each other. The LED module 12 is activated by an external force applied to the housing button 1221 and squeezed against the trigger button 1222. The housing button 1221 is embedded in the surface of the base 11, and the trigger button 1222 is provided at one end of the LED module 12.

Specifically, the switching device 122 is a wireless induction switch that includes a sensor to activate the LED module 12 by sensing external parameter changes through the sensor. In specific, the switch thereof is controlled by a remote control, a human body sensor, a brightness sensor, and a microwave sensor, and the LED module 12 is activated when the sensor on the LED module 12 senses infrared light, biological response, brightness stimulation, and microwave signals.

In this embodiment, the charging interface 123 is a USB-type interface or a Lightning interface, and the charging interface 123 is disposed monolithically on one side of the LED module 12. Among them, USB-type interfaces include all kinds of USB-type interfaces used routinely, such as USB Type A, USB Type B, and TYPE C. At the same time, according to the specific needs, it can also be considered to apply the commonly used interfaces, such as MINI USB and MICRO USB.

Figure 9:
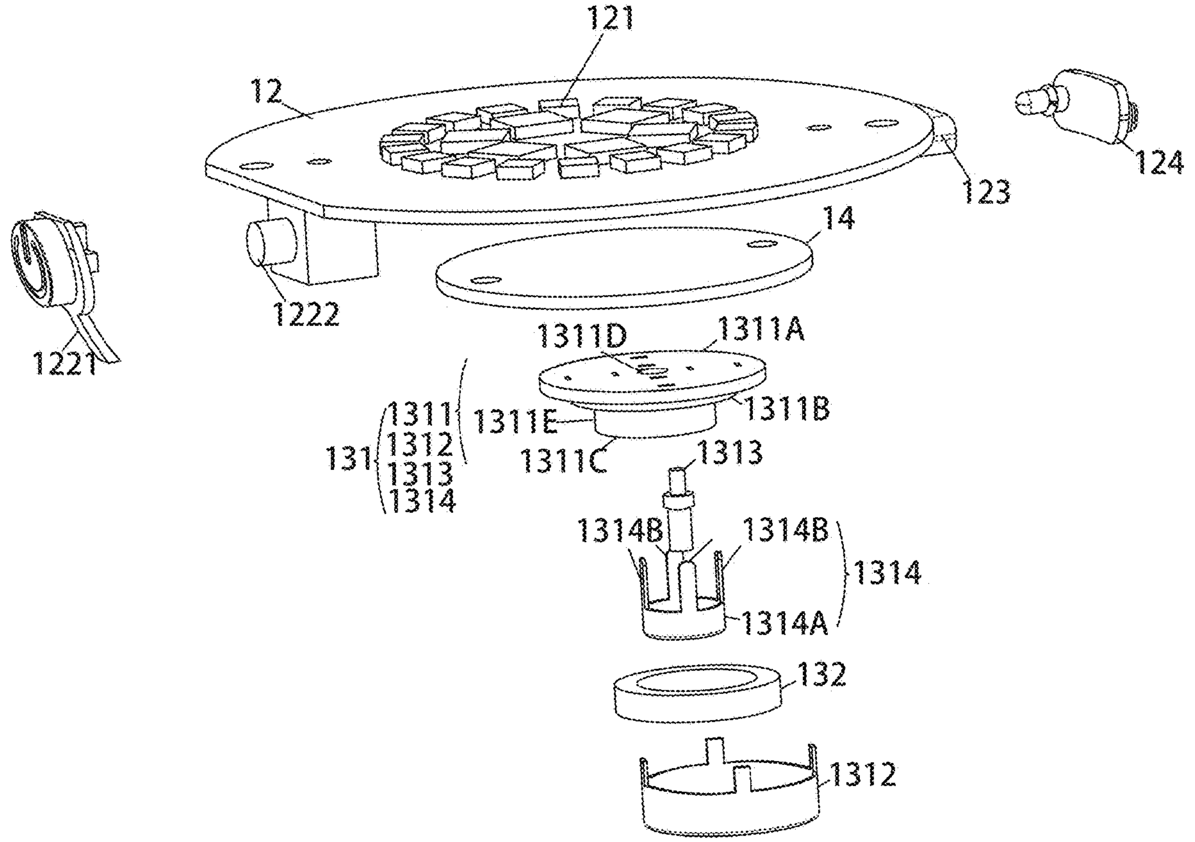
FIG. 9 is an exploded view of the interior structure of the magnetic suction charging lamp bulb.
Figure 10:
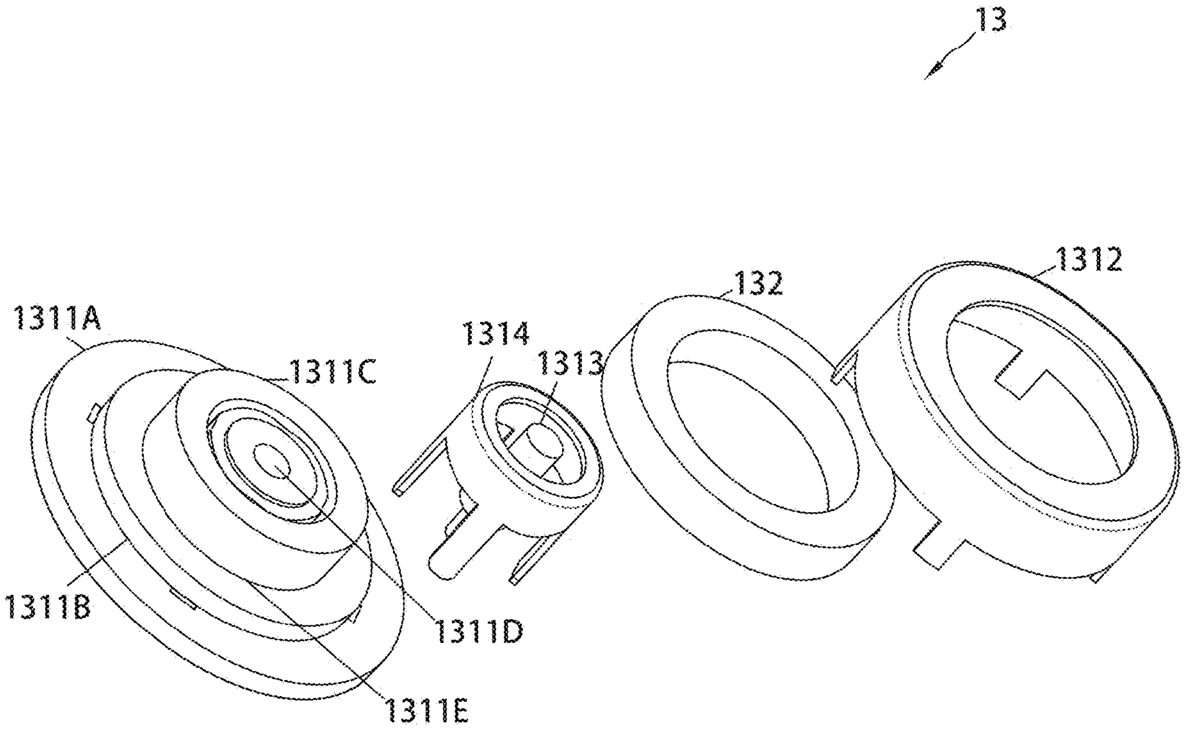
FIG. 10 is an exploded view of the magnetic connector.

In this embodiment, as shown in FIG. 9 and FIG. 10, the magnetic connector 13 includes a conductive device 131 and a magnet device 132. The conductive device 131 is contacted by the conductive probe 1313 set up to provide a conductive connection, and is installed on the circuit board using a soldering wire or a direct connection to act as a circuit connection, effectively realizing a magnetically-connected energization with a simple use operation and a good stability after connection.

Specifically, the conductive device 131 includes the conductive probe 1313 set to at least one. Preferably, according to technical experience, the conductive probe 1313 is assembled in practice with one as the benchmark, and the conductive probe 1313 is specifically set as a metal probe. When there are multiple metal probes, the metal probes are spaced apart to effectively prevent the misalignment during adsorption, especially when placed for charging, so that there can be correct positive and negative contacts.

Specifically, the conductive probe 1313 is not limited to the use of metal probes, which are only preferred as a preferred embodiment. Wherein copper material is also more preferred. When considering the replacement of components, graphite conductors, semiconductors, electrolyte solids, electro-plastics, and electro-rubber can also be considered for replacement. Typically, for example, the metal probe is replaced by an aluminum silver-plated probe.

Specifically, to improve the conductive function, as shown in FIG. 9 and FIG. 10, the conductive device 131 includes a conductive ring 1314. The conductive probe 1313 is provided in cooperation with the conductive ring 1314. The conductive ring 1314 includes a circular contact plate 1314A and at least one connecting piece 1314B formed by extending from the circular contact plate 1314A. The connecting piece 1314B may be mounted on the circuit board by soldering wires, or by direct connection for the circuit connection between the two components. The circular contact plate 1314A is electrically connected to the conductive probe for conductive connection.

In this embodiment, as described in FIG. 9 and FIG. 10, the conductive device 131 further comprises a plastic body 1311 and a housing 1312. The magnet device 132 is mounted within the plastic body 1311 and the housing 1312. The housing 1312 is preferably made of stainless steel. The plastic body 1311 and the housing 1312 are removably connected by means of a clip. The clip does not require other locking accessories, such as screws, nuts, etc., for installation, which is convenient and can save costs. When disassembled, it does not require auxiliary tools as in the case of installation.

Specifically, the plastic body 1311 includes a baseplate 1311A, a first boss 1311B and a second boss 1311C disposed hierarchically on the baseplate 1311A. A first mounting hole 1311D for mounting the conductive probe 1313 and a second mounting hole or mounting slot 1311E for mounting the magnet device 132 are provided between the baseplate 1311A, the first boss 1311B, and the second boss 1311C. The specific setting is subject to the shape of the conductive device 131 and the magnet device 132.

Specifically, the second boss 1311C is a column. The magnet device 132 is provided in a circular shape. The aperture and height of the magnet device 132 are adapted to the diameter and height of the post body, respectively, so as to enable the magnet device 132 to be movably suited to the outer peripheral side of the post body. The outer diameter of the magnet device 132 is approximately equal to, or slightly smaller than, the inner diameter of the housing 1312.

In this embodiment, a fixing plate 14 is provided between the LED module 12 and the magnetic connector 13. The fixing plate 14 serves to fix the magnetic connector 13 to ensure that the conductive device 131 can be aligned with the magnetic port 112. In this embodiment, the base 11 includes a mechanical fixing part 113 opened at the bottom, and the mechanical fixing part 113 is provided with at least one.

Figure 3:
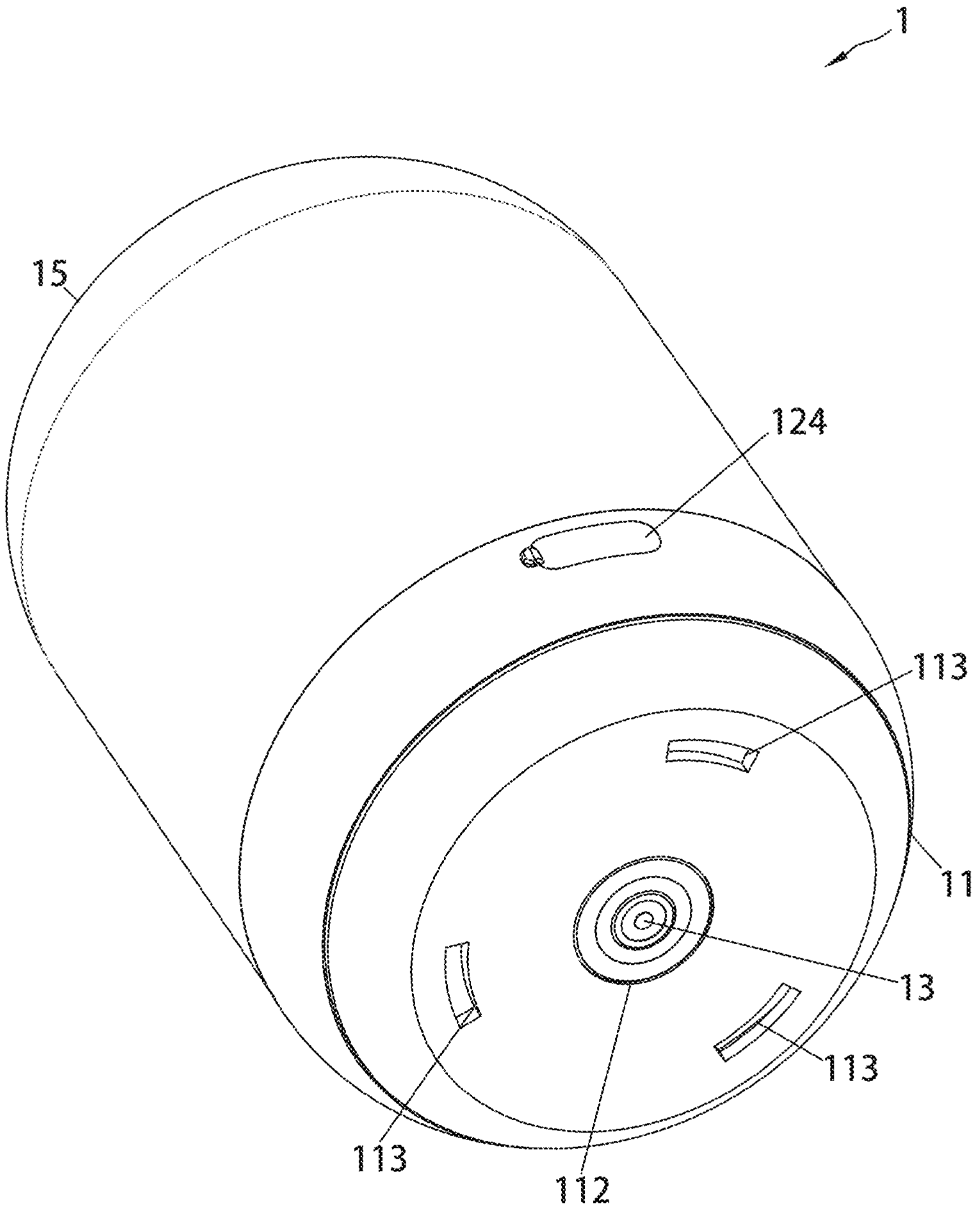
FIG. 3 is the first three-dimensional structural schematic diagram of the magnetic suction charging lamp bulb.
Figure 4:
FIG. 4 is the second three-dimensional structural schematic diagram of the magnetic suction charging lamp bulb.

Specifically, as a preference, the mechanical fixing part 113 is provided as a slot at least 1. In this embodiment, as shown in FIG. 3, the slots are preferably provided as 3 for sufficient stability. The slot is mechanically connected to make up for the magnetic connection, which makes the connection more stable. At the same time, when the magnetic connection is disabled, it connects the base 11 to the specific carrier in an independent connection manner.

Specifically, when considering the replacement of the embodiment of the mechanical fixing part 113, threaded connection, pin connection, flange connection and other conventional connection forms can be set up for replacement. The preferred slot setting form demonstrated in this embodiment can be molded directly with components such as a hook, or clip so-called, so as to lock without other accessories available, and the operation is simple.

Figure 8:
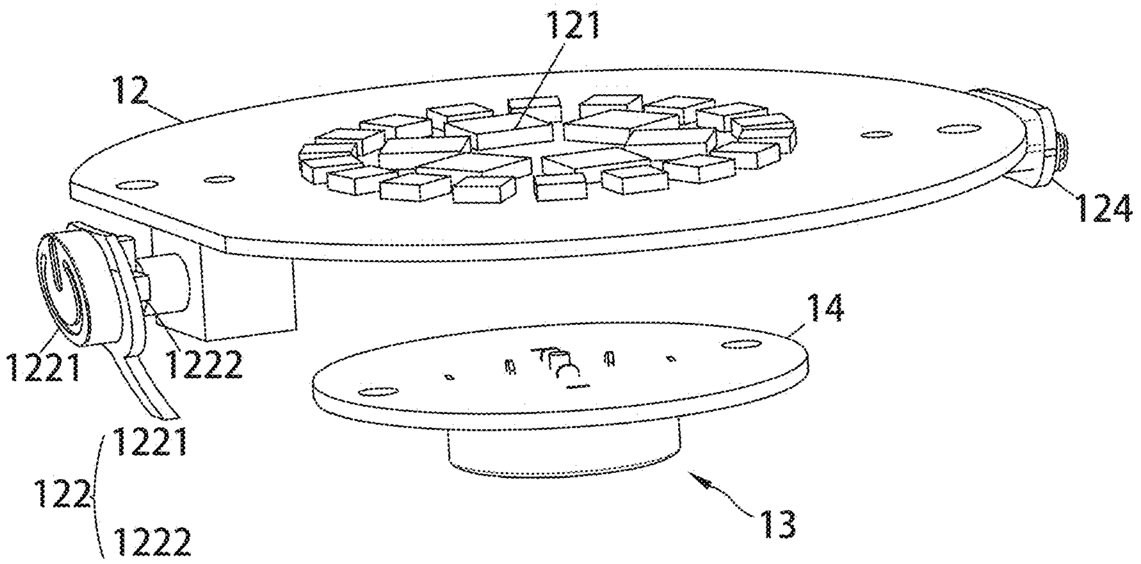
FIG. 8 is a schematic diagram of the interior structure of the magnetic suction charging lamp bulb.

In this embodiment, as shown in FIG. 8 and FIG. 9, a blocking airbag 124 is preferably provided over the charging interface 123. When not charging, the blocking airbag 124 hermetically seals the charging port 123, which can protect against dust effectively while ensuring the electricity safety of the product. In addition to the airbag-type setting, it is also possible to carry out a replacement setting of this blocking device by means of an insulating material such as plastic, rubber, or the like. In the embodiment, as shown in FIG. 1 to FIG. 4, the shape of the lampshade 15 is preferably provided in a cylindrical shape, and is set to be airtight at the same time. As a preferred embodiment, the construction of the cylinder and the hermetically sealed can better fulfill the function of concentrating light and protecting the light source. When considering embodiment replacement, the lampshade 15 may be taken in non-enclosed and other conventional shapes, such as cubes and loops.

Figure 2:
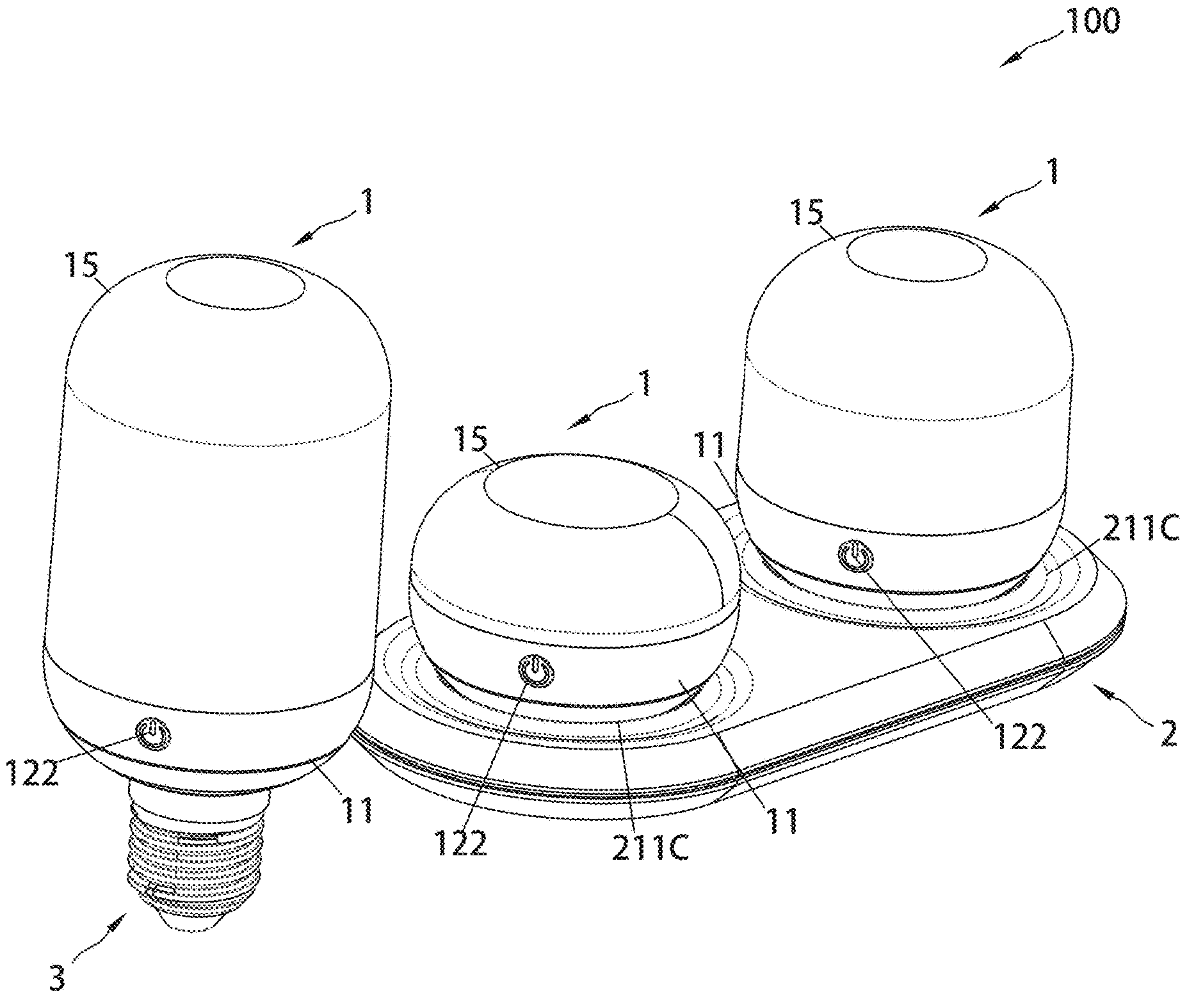
FIG. 2 is a three-dimensional structural schematic diagram of the present invention.
Figure 5:
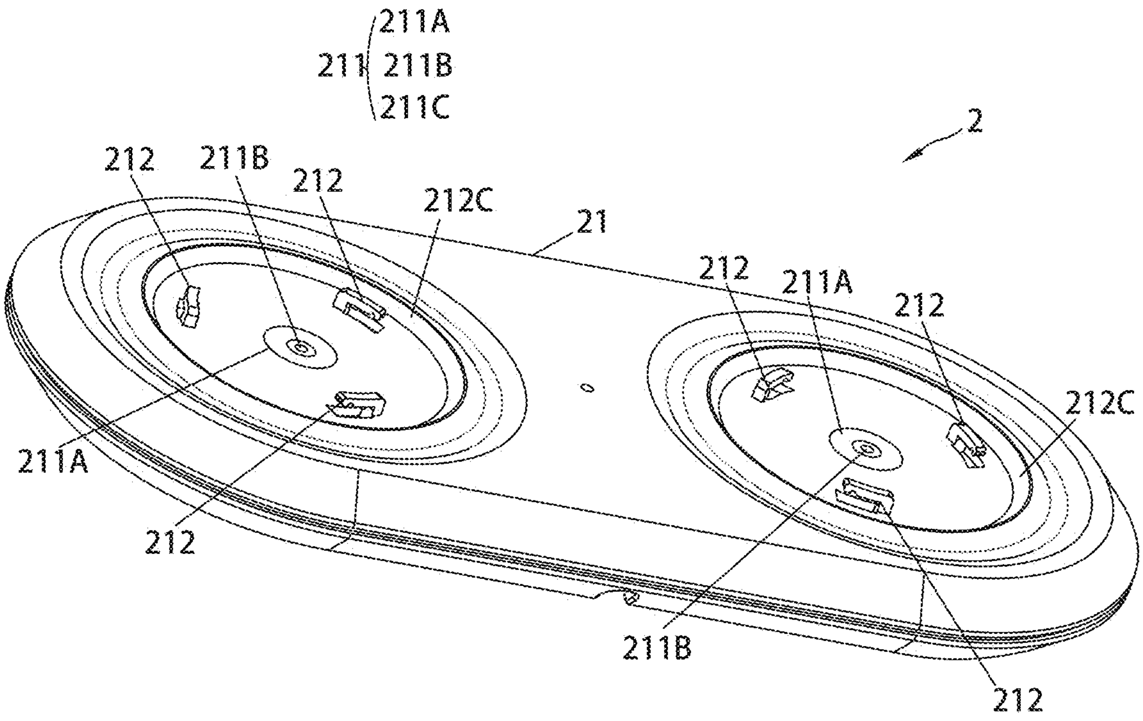
FIG. 5 is a three-dimensional structural schematic diagram of the charging base for the lamp bulb.

The present invention 100 also proposes a charging base 2 for the lamp bulb, as shown in FIG. 1 and FIG. 2 and FIG. 5. The charging base 2 for the lamp bulb includes a charging panel 21 and a wire (not shown) for supplying power. The charging panel 21 is provided with at least one charging slot 211. The charging slot 211 includes a magnetic suction part 211A and a conductive part 211B. The magnetic suction part 211A is provided as a circular magnet, and the conductive part 211B uses a conductive probe 1313. Since the structure and principle are similar to the magnetic suction connector 13 provided in the aforementioned base 11, it will not be repeated, and it is sufficient to refer to the foregoing. For the setting of the conductive part 211B of the charging slot 211, the number of conductive probes 1313 can be increased appropriately, with three as the reference.

Specifically, the number of charging slots 211 is set at two or three as a preferred embodiment, which occupies a reasonable area and also meets most of the daily needs. In this embodiment, as shown in FIG. 5, the number of charging slots 211 is set to two.

In this embodiment, as shown in FIG. 5, the charging slot 211 is preferably provided with a convex ring 211C at the periphery for enhancing stability when placing the aforementioned magnetic suction charging lamp bulb 1. Specifically, when the magnetic suction charging lamp bulb 1 is placed for charging, the convex ring 211C serves to guide the placing, and the magnetic suction charging lamp bulb 1 is accurately placed when placed in the convex ring 211C, which facilitates the placing and prevents a situation in which the placing is misplaced and the charging is not possible.

In this embodiment, as shown in FIG. 5, the charging panel 21 is preferably provided with a first mechanical docking part 212, and the first mechanical docking part 212 is provided with at least one. The first mechanical docking part 212 is used for docking and mounting with the aforementioned mechanical fixing part 113, cooperating with the aforementioned preferred embodiment slot. The first mechanical docking part 212 is provided as a hook. It is connected with the slot by hooks in corresponding positions and numbers to make an additional mechanical connection between the base 11 and the charging base 2 except the magnetic connection, so as to lock function and to enhance the stability of the connection.

Specifically, it is obvious that the first mechanical docking part 212 on the charging panel 21 and the mechanical fixing part 113 opened on the base 11 can be exchanged with each other, i.e., the first mechanical docking part 212 is provided on the base 11 while the mechanical fixing part 113 is provided on the charging panel 21, and the two are obvious equivalent replacements. Since the specific technical features are the same, they will not be repeated herein.

Figure 6:
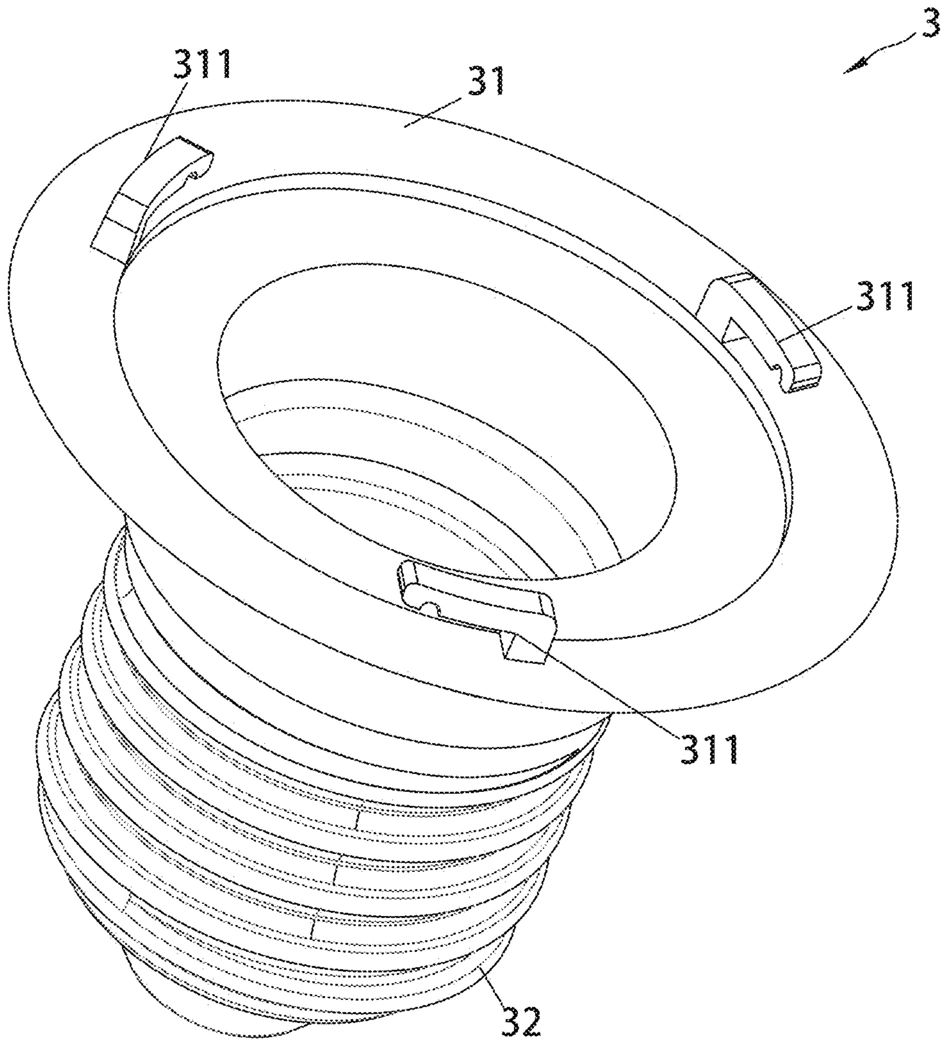
FIG. 6 is a three-dimensional structural schematic diagram of the conversion lamp cap for the lamp bulb.
Figure 7:
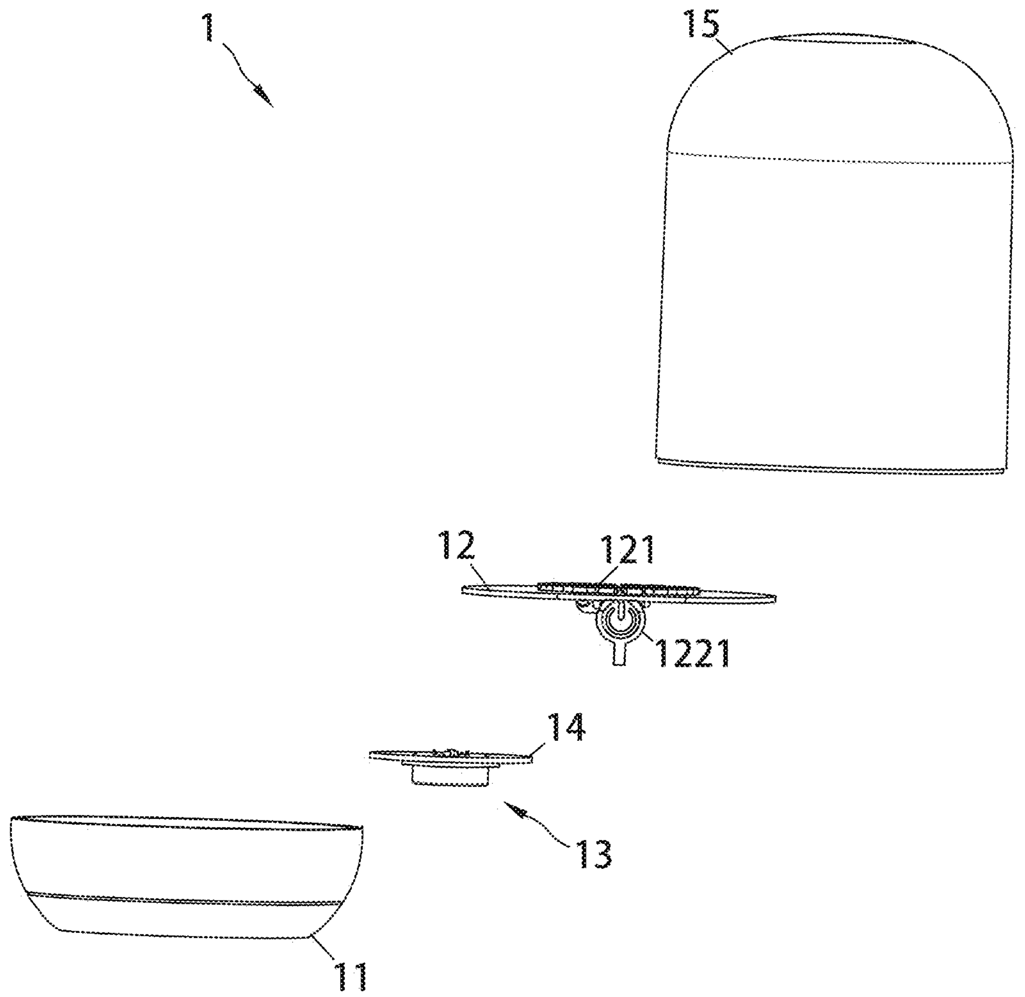
FIG. 7 is an exploded view of the magnetic suction charging lamp bulb.

In addition, since a charging base 2 for a lamp bulb adopts all of the technical solutions of all embodiments of the above-described magnetic suction charging lamp bulb 1, it has at least all of the beneficial effects brought about by the technical solutions of the above-described embodiments, which will not be repeated herein. The present invention 100 also proposes a conversion lamp cap 3 for a lamp bulb, as shown in FIG. 1, FIG. 2 and FIG. 6. The conversion lamp cap 3 for a lamp bulb includes a bulb end 31 and a fixed end 32. The bulb end 31 is provided with a second mechanical docking part 311. The second mechanical docking part 311 is connected to the base 11 by fitting the second mechanical docking part 311 to the mechanical fixing part 113, the second mechanical docking part 311 is provided with at least one. The fixed end 32 is connected to the external light fixture.

Specifically, the second mechanical docking part 311 provided in the conversion lamp cap 3 is the same as the first mechanical docking part 212 of the aforementioned charging base 2, so the description of the relevant preferred embodiments, substitution examples, and beneficial effects refer to the foregoing.

In this embodiment, the magnetic suction charging lamp bulb 1 is mounted on various light fixtures by means of the conversion lamp cap 3, and the models of the conversion lamp cap include e27, e26, b22, e14, and e12, etc., meaning that the commonly used light fixtures are applicable.

Once again, since a conversion lamp cap 3 for the lamp bulb adopts all the technical solutions of all the embodiments of a magnetic suction charging lamp bulb 1, and a charging base 2 for the lamp bulb as described above, it has at least all the beneficial effects brought about by the technical solutions of the embodiments described above, which will not be repeated herein.

The following contents are described as the working principle of the present invention 100 as a whole:

1. About the magnetic suction charging lamp bulb 1: first, when in use, the magnetic suction charging lamp bulb 1 is attached and mounted on the surface of any iron product by the magnetic connector 13 through the magnetic suction port 112 opened by the base 11, and it can also be magnetically affixed to the furniture, wall, light fixtures, and the products that need to be illuminated by the metal sheet; second, when charging, the direction of the magnetic suction port 112 opened by the base 11 is aligned with the charging slot 211 provided on the charging base 2 for the lamp bulb, and the conductive power transmission and magnetic suction alignment functions are realized through the magnetic suction connector 13; in addition, wired charging is also possible via the charging port 123; finally, when it is necessary to activate the shutdown, the switch is controlled in a specific push-button wireless manner through the switching device 122.
2. About the charging base 2: The charging base 2 is designed for magnetic suction charging of the aforementioned magnetic suction charging lamp bulb 1. In specific use, through the magnetic suction connector 13, the magnetic suction charging lamp bulb 1 and the charging base 2 are used as the electrically conductive female end and the male end, respectively, and are specifically set in position at the magnetic suction port 112 and the charging slot 211. It is attached to the magnetic suction part 211A of the charging slot 211 through the magnetic suction port 112, and then the conductive part 211B therein is used to transmit power to the conductive device 131, realizing the conductive power transmission function.
3. About the conversion lamp cap 3: the conversion lamp cap 3 mounts the magnetic suction charging lamp bulb 1 on various light fixtures through mechanical connection, increasing the applicable scenarios of the magnetic suction charging lamp bulb 1. The above-described main parts are only preferred embodiments of the present invention 100, and are not intended to limit the patent scope of the present invention 100 as a result. Any equivalent structural transformation made under the inventive conception of the present invention 100 by utilizing the contents of the Instructions of the present invention 100 and the drawings, or the direct/indirect application in other related technical fields are included in the scope of patent protection of the present invention 100.

What is claimed is:

1. A magnetic suction charging lamp bulb characterized in:

a base, including a charging port and a magnetic suction port provided across a surface;

a LED module provided in the base, the LED module includes a lamp bead and a switching device, and a charging interface provided in conjunction with the charging port of the base;

a magnetic connector, provided in the base, the magnetic connector comprises a conductive device for charging under magnetic suction and a magnet device for magnetic mounting, the conductive device and the magnet device operate through a magnetic suction port;

the conductive device comprises a set of conductive probes, and the conductive probes are cooperatively provided with a conductive ring;

a lampshade disposed over the base for refracting and projecting rays from the lamp bead and protecting the lamp bead.

2. The magnetic suction charging lamp bulb as claimed in claim 1, characterized in that: the switching device is a push-button switch or a wireless induction switch.

3. The magnetic suction charging lamp bulb as claimed in claim 2, characterized in that: the push-button switch includes a housing button and a trigger button offset from each other the LED module is activated by an external force applied to the housing button and squeezed against the trigger button, the housing button is embedded on the surface of the base, and the trigger button is provided at one end of the LED module.

4. The magnetic suction charging lamp bulb as claimed in claim 2, characterized in that: the wireless induction switch includes a sensor, the LED module is activated by sensing a parameter change from outside through the sensor.

5. The magnetic suction charging lamp bulb as claimed in claim 1, characterized in that: the charging interface is a USB-type interface or a Lightning interface, and the charging interface is disposed monolithically on one side of the LED module.

6. The magnetic suction charging lamp bulb as claimed in claim 1, characterized in that: the base also includes a set of mechanical fixing parts provided at the bottom.

7. A charging base for cooperating with the magnetic suction charging lamp bulb as claimed in claim 1, characterized in that the charging base includes: a charging panel and a wire for supplying power, the charging panel is provided with a set of charging slots, each charging slot includes a magnetic suction part and a conductive part.

8. The charging base as claimed in claim 6, characterized in that: the charging panel is provided with a set of first mechanical docking part.

9. A conversion lamp cap for cooperating with the magnetic suction charging lamp bulb as claimed in claim 1, characterized in that the conversion lamp cap comprises: a bulb end and a fixed end, the bulb end is provided with a set of second mechanical docking parts, the bulb end is connected to the base by the second mechanical docking parts being cooperatively mounted on the mechanical fixing parts of the base, and the fixed end is connected to an external light fixture.

* * * * *